United States Patent
Kim et al.

(10) Patent No.: US 12,255,490 B2
(45) Date of Patent: Mar. 18, 2025

(54) DISPLAY APPARATUS AND CONTROL METHOD THEREOF

(71) Applicant: SAMSUNG ELECTRONICS CO., LTD., Suwon-si (KR)

(72) Inventors: Moonyoung Kim, Suwon-si (KR); Jeongil Kang, Suwon-si (KR); Keonwoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 18/130,609

(22) Filed: Apr. 4, 2023

(65) Prior Publication Data
US 2023/0307947 A1  Sep. 28, 2023

Related U.S. Application Data

(63) Continuation of application No. PCT/KR2022/021710, filed on Dec. 30, 2022.

(30) Foreign Application Priority Data

Mar. 23, 2022 (KR) .................... 10-2022-0036027

(51) Int. Cl.
H02J 9/06 (2006.01)
(52) U.S. Cl.
CPC .................... H02J 9/065 (2013.01)
(58) Field of Classification Search
CPC ......................................... H02J 9/065
See application file for complete search history.

(56) References Cited

U.S. PATENT DOCUMENTS

| 8,659,707 B2 | 2/2014 | Toyoda |
| 9,306,393 B2 | 4/2016 | Jung |
| 9,836,109 B2 | 12/2017 | Lee |

(Continued)

FOREIGN PATENT DOCUMENTS

| CN | 112346514 A | 2/2021 |
| JP | 2004-147022 A | 5/2004 |

(Continued)

OTHER PUBLICATIONS

Written Opinion (PCT/ISA/237) issued Apr. 11, 2023 from the International Searching Authority in International Application No. PCT/KR2022/021710.

(Continued)

*Primary Examiner* — Andrew Sasinowski
(74) *Attorney, Agent, or Firm* — Sughrue Mion, PLLC

(57) ABSTRACT

A display apparatus is disclosed. The display apparatus includes: a backlight; a main circuit; a power supply configured to output a first power to drive the backlight and a second power to drive the main circuit; a first battery configured to be charged by the first power and supply power to the backlight; a second battery which is connected to the first battery in series, and configured to be charged by the first power and supply power to the backlight and the main circuit; and a control circuit configured to control the first battery and the second battery to be charged with the first power for a first time period, and drive the backlight with first battery power of the first battery and second battery power of the second battery for a second time period.

20 Claims, 16 Drawing Sheets

| Time-of-Use Periods | Peak Rates 8 a.m. to Midnight | Off-Peak Rates All other hours of the week |
|---|---|---|
| June 1 to Sept 30 | 23.84 cents/kWh | 1.68 cents/kWh |
| All other months | 8.82 cents/kWh | 1.68 cents/kWh |

(56) References Cited

U.S. PATENT DOCUMENTS

| | | | |
|---|---|---|---|
| 9,985,469 B2 | 5/2018 | Jo | |
| 2010/0033980 A1* | 2/2010 | Vogel | B60Q 3/46 |
| | | | 313/504 |
| 2011/0204789 A1* | 8/2011 | Kawachi | G09F 13/005 |
| | | | 315/86 |
| 2012/0320273 A1 | 12/2012 | Toyoda | |
| 2013/0175860 A1 | 7/2013 | Jung | |
| 2014/0210833 A1 | 7/2014 | Midorikawa | |
| 2016/0126782 A1 | 5/2016 | Jo | |
| 2016/0239062 A1 | 8/2016 | Lee | |
| 2019/0319480 A1* | 10/2019 | Cui | H01M 10/46 |
| 2020/0146124 A1* | 5/2020 | Hsia | H05B 47/105 |

FOREIGN PATENT DOCUMENTS

| | | | |
|---|---|---|---|
| JP | 5060641 B1 | 10/2012 | |
| JP | 2014-146152 A | 8/2014 | |
| JP | 5608916 B2 | 10/2014 | |
| KR | 10-2005-0044040 A | 5/2005 | |
| KR | 10-2008-0000466 A | 1/2008 | |
| KR | 10-0829102 B1 | 5/2008 | |
| KR | 10-2009-0074630 A | 7/2009 | |
| KR | 10-2012-0003804 A | 1/2012 | |
| KR | 10-1425141 B1 | 9/2014 | |
| KR | 10-2016-0050577 A | 5/2016 | |
| KR | 10-2163893 B1 | 10/2020 | |

OTHER PUBLICATIONS

International Search Report (PCT/ISA/210) issued Apr. 11, 2023 from the International Searching Authority in International Application No. PCT/KR2022/021710.

* cited by examiner

FIG. 1A

| Time-of-Use Periods | Peak Rates<br>8 a.m. to Midnight | Off-Peak Rates<br>All other hours of the week |
|---|---|---|
| June 1 to Sept 30 | 23.84 cents/kWh | 1.68 cents/kWh |
| All other months | 8.82 cents/kWh | 1.68 cents/kWh |

DISPLAY APPARATUS AND CONTROL METHOD THEREOF

CROSS-REFERENCE TO RELATED APPLICATIONS

This application is a continuation of PCT/KR2022/021710, filed on Dec. 30, 2022, at the Korean Intellectual Property Receiving Office and claims priority under 35 U.S.C. § 119 to Korean Patent Application No. 10-2022-0036027, filed on Mar. 23, 2022 at the Korean Intellectual Property Office, the disclosures of each which are incorporated by reference herein in their entireties.

BACKGROUND

1. Field

The disclosure relates to a display apparatus and a control method thereof, and more particularly, to a display apparatus which drives a backlight using electricity generated during off-peak time periods and a control method thereof.

2. Description of Related Art

With power generation, maintaining a continuous generation state is more effective than repeatedly starting and stopping of a power plant according to necessity. Accordingly, although a power plant continuously generates electricity, because more electricity is used during daytime at which a person is mainly active, a shortage in electric power is more likely occur during the daytime and a surplus of electric power is more likely to occur during nighttime.

Accordingly, as shown in FIG. 1A, electric power companies of countries worldwide are applying a time-based differential rate system, and electrical rates may differ by 10 times or more according to time of use.

Based on the circumstance described above, display apparatuses provided with a battery that can store energy are being developed to utilize advantages of electricity generated during off-peak time periods which is relatively inexpensive and allows for more efficient power generation. For example, as shown in FIG. 1B, a product which has a battery (e.g., tablet, notebook, etc.) may have a bidirectional converter structure for charging and discharging, and a charging and discharging converter of a relatively large capacity is necessary because there is a need for discharging to supply power required by the product even if charging is slow.

However, because a display apparatus such as a TV has a relatively large electric power consumption, the battery system described above may be a burden. Accordingly, there is a need for a display apparatus, which uses the advantages of off-peak electricity using a battery and includes a simple battery system, to be developed.

SUMMARY

The present disclosure provides a display apparatus which can substantially reduce electric power consumption and a control method thereof.

According to an embodiment, a display apparatus includes: a backlight; a main circuit; a power supply configured to output a first power to drive the backlight and a second power to drive the main circuit; a first battery configured to be charged by the first power and supply power to the backlight; a second battery which is connected to the first battery in series, and configured to be charged by the first power and supply power to the backlight and the main circuit; and a control circuit configured to control the first battery and the second battery to be charged with the first power for a first time period, and drive the backlight with first battery power of the first battery and second battery power of the second battery for a second time period.

The main circuit may be configured to reduce, based on the display apparatus being turned-on while the control circuit is charging the first battery and the second battery, a brightness of the backlight to a threshold ratio.

The control circuit may be further configured to drive, based on the display apparatus being turned-off, the main circuit with the second battery power.

The control circuit may be configured to drive, based on an alternating current power not being supplied to the power supply, the backlight with the first battery power and the second battery power, and drive the main circuit with the second battery power.

The power supply may include: a first terminal configured to output the first power; and a second terminal configured to output the second power. The control circuit may include: a first transistor including a source connected to the first terminal, and a drain connected to a first end of the first battery; a first diode including an is connected to a second end of the first battery, and a cathode connected to the second terminal; an inductor including a first end connected to the first terminal; a second transistor including a drain connected to a second end of the inductor, and a source connected to a ground node; and a second diode including an anode connected to the second end of the inductor, and a cathode connected to the first end of the first battery. The second battery may include a first end connected to the second end of the first battery, and a second end connected to the ground node.

The control circuit may be further configured to turn-off the first transistor during the first time period, and control the first battery and the second battery to be charged with the first power based on a pulse width modulation (PWM) signal received through a gate of the second transistor.

The control circuit may be further configured to turn-on the first transistor during the second time period and drive the backlight with power of the first battery power and the second battery power, and a sum of a first voltage of the first battery and a second voltage of the second battery may be greater than a voltage of the first power.

The main circuit may be configured to turn-off the power supply based on a turn-off signal for the display apparatus being received, the control circuit may be further configured to drive the main circuit with power of the second battery power, and a second voltage of the second battery may be smaller than a voltage of the second power.

The control circuit may further include: a resistor including a first end connected to the first end of the first battery; and a third transistor including a drain connected to a second end of the resistor, and a source connected to the second end of the first battery.

The control circuit may be further configured to turn-on the third transistor at a threshold time point within the first time period to reduce a difference in a voltage of a cell included in the first battery and a voltage of a cell included in the second battery.

The display apparatus may further include an integrated circuit (IC) chip configured to: generate a second control signal based on a first control signal received from the main circuit; and transmit the second control signal to the control circuit. The control circuit may be further configured to control charging and discharging of the first battery and the second battery based on the second control signal.

A voltage of the first battery may be greater than a voltage of the second battery.

The display apparatus may further include a display configured to display a user interface (UI) prompting a user to designate the first time period and the second time period.

According to an embodiment, a control method of a display apparatus includes: outputting, by a power supply, a first power to drive a backlight and a second power to drive a main circuit; charging a first battery and a second battery with the first power for a first time period; driving the backlight with first battery power of the first battery and second battery power of the second battery for a second time period; and supplying the second battery power to the main circuit for a third time period, wherein the second battery is connected to the first battery in series.

The charging may include lowering, based on the display apparatus being turned-on while the first battery and the second battery are being charged, a brightness of the backlight to a threshold ratio.

According to an embodiment, a non-transitory computer readable recording medium has embodied thereon a program, which when executed by a processor of a display apparatus, causes the display apparatus to execute a method including: outputting, by a power supply, a first power to drive a backlight and a second power to drive a main circuit; charging a first battery and a second battery with the first power for a first time period; driving the backlight with first battery power of the first battery and second battery power of the second battery for a second time period; and supplying the second battery power to the main circuit for a third time period, wherein the second battery is connected to the first battery in series.

According to an embodiment, a display apparatus includes: a power supply configured to output a first power to a first terminal and a second power to a second terminal; a first battery configured to provide first battery power; a second battery connected to the first battery in series and configured to provide second battery power; and a control circuit configured to: control the first battery and the second battery to be charged with the first power for a first time period; and drive a backlight with the first battery power and the second battery power for a second time period.

The display apparatus may further include a main circuit, and the control circuit may be further configured to drive the main circuit with the second battery power while the display apparatus is operating in a standby mode.

The control circuit may include a first transistor connected in series with the first battery between the first terminal and the first battery and the second battery, and the control circuit may be further configured to turn the first transistor on during the second time period.

The control circuit may be further configured to turn the first transistor off during the second time period.

The control circuit may further include an inductor connected in parallel with the first transistor between the first terminal and the first battery.

The control circuit may further include a second transistor connected in series with the inductor between the inductor and a ground node, and the control circuit may be further configured to control the second transistor according to a pulse width modulation signal during the second time period.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 1A is a diagram illustrating power rates during time periods;

DETAILED DESCRIPTION

Figure 1B:
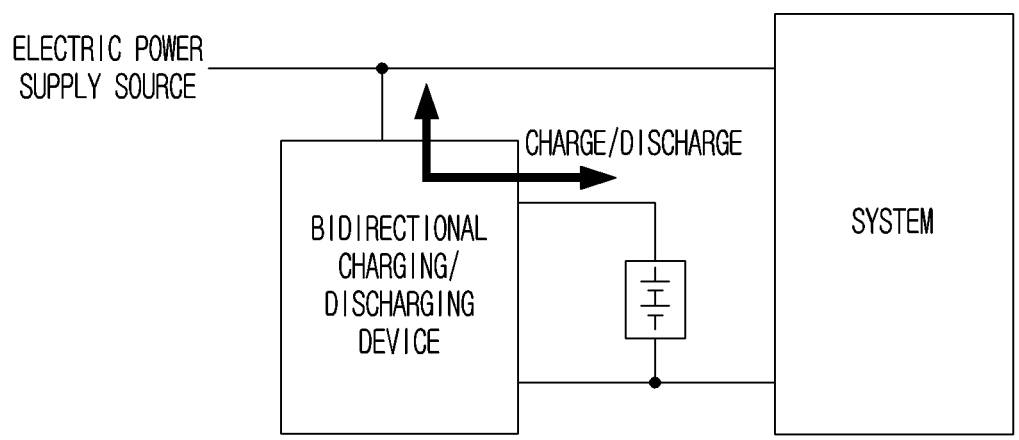
FIG. 1B is a diagram illustrating a system with a bidirectional charging/discharging device.

Hereinafter, embodiments will be described with reference to the accompanying drawings. Embodiments may be diversely modified. Accordingly, aspects embodiments are illustrated in the drawings and are described in detail in the detailed description. However, it is to be understood that the present disclosure is not limited thereto, but includes all modifications, equivalents, and substitutions without departing from the scope and spirit of the present disclosure. Also, well-known functions or constructions are not described in detail since they would obscure the disclosure with unnecessary detail.

Terms used in describing embodiments are general terms selected that are currently widely used considering their function herein. However, the terms may change depending on intention, legal or technical interpretation, emergence of new technologies, and the like of those skilled in the art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

As used herein, the terms "1st" or "first" and "2nd" or "second" may use corresponding components regardless of importance or order and are used to distinguish a component from another component without limiting the components.

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other In this disclosure, the term "user" may refer to a person using an electronic device or a device (e.g., artificial intelligence electronic device) using an electronic device.

The disclosure will be described in greater detail below with reference to the accompanied drawings.

Figure 2:
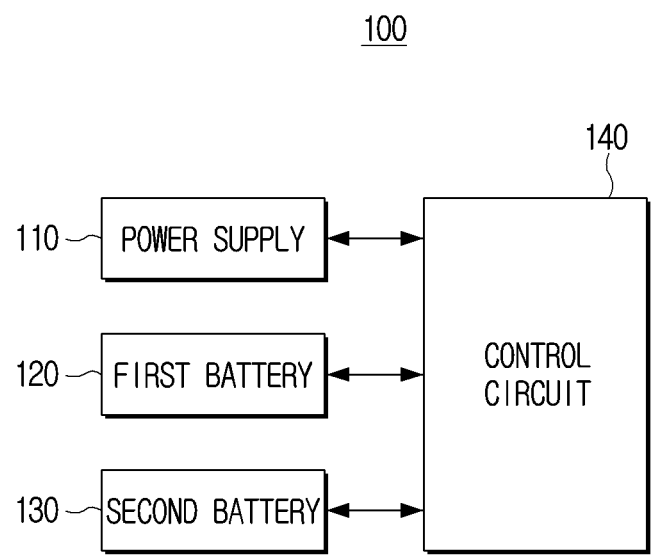
FIG. 2 is a block diagram illustrating a configuration of a display apparatus according to an embodiment.

FIG. 2 is a block diagram illustrating a configuration of a display apparatus according to an embodiment. As shown in FIG. 2, a display apparatus 100 may include a power supply 110 (e.g., a power supply circuit), a first battery 120, a second battery 130, and a control circuit 140.

The power supply 110 may output a first power (e.g., a first voltage) for driving a backlight and a second power (e.g., a second voltage) for driving a main circuit. Here, the power supply 110 may include a first terminal which outputs the first power and a second terminal which outputs the second power, and the first terminal may be connected with the backlight and the second terminal may be connected with the main circuit. In addition, the power supply 110 may be connected with a control circuit through the first terminal and may supply the first power to the first battery 120 and the second battery 130.

However, embodiments are not limited thereto, and the first power and the second power may be respectively supplied to circuit configurations in other than the backlight and the main circuit.

The first battery 120 may supply power charged by the first power to the backlight. The second battery 130 may be connected to the first battery 120 in series, and may supply power charged by the first power to the backlight or the main circuit. Here, a voltage of the first battery 120 may be greater than a voltage of the second battery 130. In addition, a sum of the voltage of the first battery 120 and the voltage of the second battery 130 may be greater than a voltage of the first power. In addition, the voltage of the second battery 130 may be smaller than a voltage of the second power.

The control circuit 140 may charge the first battery 120 and the second battery 130 with the first power for a first time period, and drive the backlight with power of the first battery 120 and the second battery 130 for a second time period.

The main circuit may lower brightness of the backlight to a threshold ratio when the display apparatus 100 is turned-on while the control circuit 140 is charging the first battery 120 and the second battery 130. In general, there is a high likelihood of a time point at which the first battery 120 and the second battery 130 are charged being nighttime, and in this case, there is no problem to a viewing of a user even if the brightness of the backlight is lowered compared to daytime. Accordingly, the main circuit may lower the brightness of the backlight to a threshold ratio, and the first battery 120 and the second battery 130 may be charged using remaining energy. Here, nighttime is a time slot at which there is a relatively low demand for electricity and an electricity rate is inexpensive, and may be initially set to a preset time period when manufacturing the display apparatus, and changed by the user thereafter. For example, nighttime may be a time slot of between 22:00 (10:00 pm) and 06:00 (6:00 am), and daytime may be a time slot excluding nighttime.

However, embodiments are not limited thereto, and the brightness of the backlight may not be changed even if the user views content at nighttime, and in this case, the control circuit 140 may not charge the first battery 120 and the second battery 130. Then, based on the content viewing by the user ending and it being nighttime (i.e., when the display apparatus 100 is turned off at nighttime), the control circuit 140 may begin charging the first battery 120 and the second battery 130.

The control circuit 140 may drive the main circuit with power of the second battery 130 when the display apparatus 100 is turned-off. When the display apparatus 100 is turned-off, the main circuit may be in a state of performing only a minimum operation. For example, the main circuit may perform only an operation for monitoring for a turn-on signal of the user. That is, when the display apparatus 100 is turned-off, because electric power consumption of the display apparatus 100 is minimal, driving of the main circuit may be possible with only the second battery 130.

The control circuit 140 may not drive the main circuit with power of the second battery 130 even when the display apparatus 100 is turned-off while the first battery 120 and the second battery 130 are being charged. Then, after the first battery 120 and the second battery 130 are charged and if the display apparatus 100 maintains a turned-off state, the control circuit 140 may drive the main circuit with power of the second battery 130.

However, embodiments are not limited thereto, and the control circuit 140 may drive the main circuit with power of the second battery 130 when the display apparatus is turned-off while the first battery 120 and the second battery 130 are being charged. In this case, the second battery 130 may perform charging and discharging simultaneously.

The control circuit 140 may drive the backlight with power of the first battery 120 and the second battery 130, and drive the main circuit with power of the second battery 130, when alternating current power is not supplied to the power supply 110. For example, when a power outage occurs or the display apparatus 100 is disconnected from an external power source and alternating current power is not supplied to the power supply 110, the control circuit 140 may drive the backlight with power of the first battery 120 and the second battery 130, and drive the main circuit with power of the second battery 130. Through the operations described above, it may be possible to view content by the user for a certain time even if a power outage occurs.

The control circuit 140 may drive the backlight with power of the first battery 120 and the second battery 130, and drive the main circuit with power of the second battery 130. The main circuit may lower the brightness of the backlight if the alternating current power is not supplied to the power supply 110. A content viewing time of the user may be further secured through the operations described above.

The control circuit 140 may include a first transistor by which a source is connected to the first terminal, and a drain is connected to one end of the first battery 120, a first diode by which an anode is connected to other end of the first battery 120, and a cathode is connected to the second terminal, an inductor by which one end is connected to the first terminal, a second transistor by which the drain is connected to other end of the inductor, and the source is grounded, and a second diode by which an anode is connected to other end of the inductor, and a cathode is connected to one end of the first battery. Here, the second battery 130 may be configured such that one end is connected to the other end of the first battery 120, and the other end is grounded.

The control circuit 140 may turn-off the first transistor during the first time period, and charge the first battery 120 and the second battery 130 with the first power based on a pulse width modulation (PWM) signal received through a gate of the second transistor. As described above, the sum of the voltage of the first battery 120 and the voltage of the second battery 130 may be greater than the voltage of the first power. That is, if a drain voltage of the second transistor is lower than a voltage of one end of the first battery 120, the second diode may be turned-off, and the inductor may be charged. Then, if the drain voltage of the second transistor becomes greater than a voltage of one end of the first battery 120, the first battery 120 and the second battery 130 may be charged.

The control circuit 140 may drive the backlight with power of the first battery 120 and the second battery 130 by turning-on the first transistor during the second time period. Here, the first transistor may perform a role of a switch for discharging the first battery 120 and the second battery 130. Then, because the sum of the voltage of the first battery 120 and the voltage of the second battery 130 is greater than the voltage of the first power, the backlight may be driven with the voltage of the first battery 120 and power of the second battery 130 which is not the first power.

The main circuit may turn-off the power supply 110 when a turn-off signal for the display apparatus 100 is received, and the control circuit 140 may drive the main circuit with power of the second battery 130. As described above, although the voltage of the second battery 130 is smaller than the voltage of the second power, the main circuit may be driven with the power of the second battery 130 as the power supply 100 is turned-off.

The control circuit 140 may further include a resistor by which one end is connected to one end of the first battery 120, and a third transistor by which the drain is connected to other end of the resistor, and the source is connected to the other end of the first battery 120. The control circuit 140 may turn-on the third transistor at a threshold time point within the first time period and reduce a difference in a voltage of a cell included in the first battery and a voltage of a cell included in the second battery. That is, a battery balancing operation may be performed through the third transistor, and the difference in voltage between the cells of the first battery 120 and the second battery 130 may be reduced.

An integrated circuit (IC) chip which receives a first control signal from the main circuit may be further included, and the IC chip may obtain a second control signal based on the first control signal, and transmit the second control signal to the control circuit 140 for the control circuit to control the charging and discharging the first battery 120 and the second battery 130. For example, the IC chip may receive a signal for controlling the first transistor, the second transistor, and the third transistor from the main circuit. At this time, the signal for controlling each transistor may be a high or low signal. The IC chip may transmit a control signal for controlling the first transistor and a control signal for controlling the third transistor as signals received from the main circuit as is to the control circuit 140. However, the IC chip may transmit the PWM signal to the control circuit 140 if the control signal for controlling the second transistor is a high signal.

The display apparatus 100 may further include a display which displays a user interface (UI) requesting designations of the first time period and the second time period. The display apparatus 100 may further include an input interface through which the designations of the first time period and the second time period. The input interface may include a communication interface to allow the display apparatus 100 to communicate with an external device. The input interface may include one or more buttons or a touchscreen.

The display apparatus 100 may provide information of a charged or discharged state, and the like, through the display. For example, the display apparatus 100 may provide, based on an event such a changing of a channel occurring, a UI including the charged or discharged state through the display. Alternatively, the display apparatus 100 may provide information of the charged or discharged state, and the like, using pixels arrayed at an edge of the display. For example, the display apparatus 100 may control the display for the pixel arrayed at the edge of the display to display a green color if the display apparatus 100 is being charged. However, embodiments are not limited thereto, and the display apparatus 100 may provide information of the charged or discharged state, and the like through the display through any number of various methods.

The display may be implemented as a display of various forms such as, for example, and without limitation, a liquid crystal display (LCD), an organic light emitting diode (OLED) display, a plasma display panel (PDP), or the like. In the display, a driving circuit, which may be implemented in the form of an A-Si TFT, a low temperature poly silicon (LTPS) TFT, an organic TFT (OTFT), or the like, a backlight, and the like may be included. The display may be implemented as a touch screen coupled with a touch sensor, a flexible display, a three-dimensional display (3D display), or the like.

As described above, the display apparatus 100 may charge the first battery 120 and the second battery 130 using off-peak electricity, and reduce electric power consumption of the display apparatus 100 by using the electric power of the first battery 120 and the second battery 130 at peak electric power consumption times at which the electricity rate is expensive.

A circuit configuration and operation of the display apparatus 100 will be described in greater detail below through FIG. 3 to FIG. 14.

Figure 3:
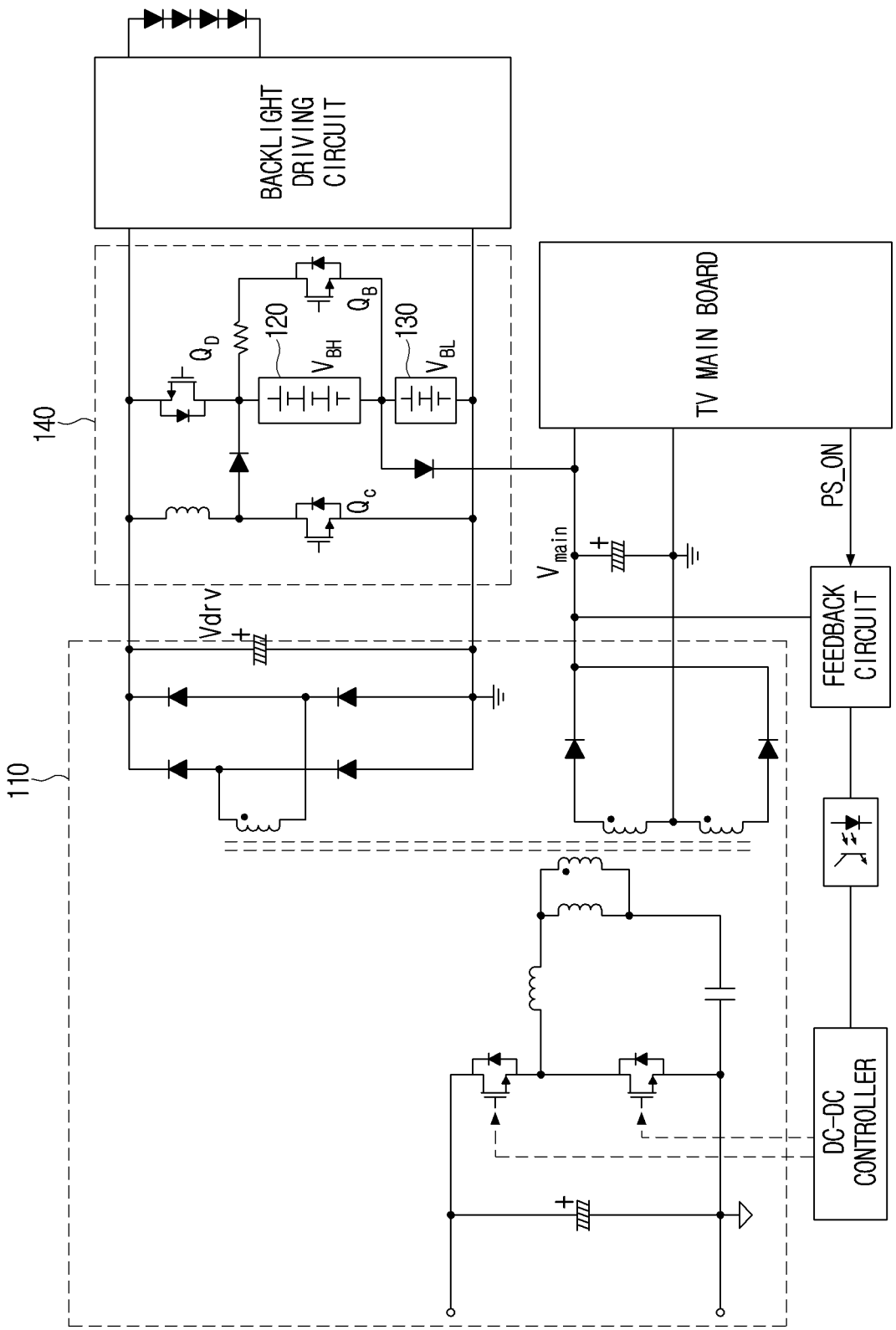
FIG. 3 is a diagram illustrating a detailed circuit of a display apparatus according to an embodiment.

FIG. 3 is a diagram illustrating a detailed circuit of the display apparatus 100 according to an embodiment.

The display apparatus 100 may include the power supply 110, the first battery 120, the second battery 130, and the control circuit 140. In addition, the display apparatus 100 may further include the backlight (a plurality of diodes), a backlight driving circuit, the main circuit (a TV main board), and a circuit by which the main circuit provides a feedback signal to the power supply 110. The main circuit may include a processor, controller, microcontroller or other circuitry.

The power supply 110 may provide the first power (Vdrv) to the backlight and the control circuit 140 through the first terminal, and provide the second power (Vmain) to the main circuit through the second terminal. Here, the power supply 110 may provide the first power to the backlight via the backlight driving circuit. The backlight driving circuit may output a constant current to the backlight even if input voltage is changed. Accordingly, when driving the backlight through the first battery 120 and the second battery 130, a converter may not be needed, allowing for a simple circuit configuration.

The sum of the voltage (VBH) of the first battery 120 and the voltage (VBL) of the second battery may be greater than the voltage of the first power, and the voltage of the second battery may be smaller than the voltage of the second power.

The control circuit 140 may include the first transistor (QD) by which the source is connected to the first terminal, and the drain is connected to one end of the first battery 120, the first diode by which an anode is connected to the other end of the first battery 120, and a cathode is connected to the second terminal, the inductor by which one end is connected to the first terminal, the second transistor (Qc) by which the drain is connected to other end of the inductor, and the source is grounded, and the second diode by which an anode is connected to other end of the inductor, and a cathode is connected to one end of the first battery 120.

In addition, the control circuit 140 may further include the resistor by which one end is connected to the one end of the first battery 120, and the third transistor (QB) by which the source is connected to the other end of the first battery 120.

Here, the second battery 130 may be configured such that one end is connected to the other end of the first battery 120, and the other end is grounded.

The control circuit 140 may control the charging and discharging operation of the first battery 120 and the second battery 130 based on a gate signal of the first transistor, a gate signal of the second transistor, and a gate signal of the third transistor, and specific examples thereof will be described through the drawings below.

Figure 4:
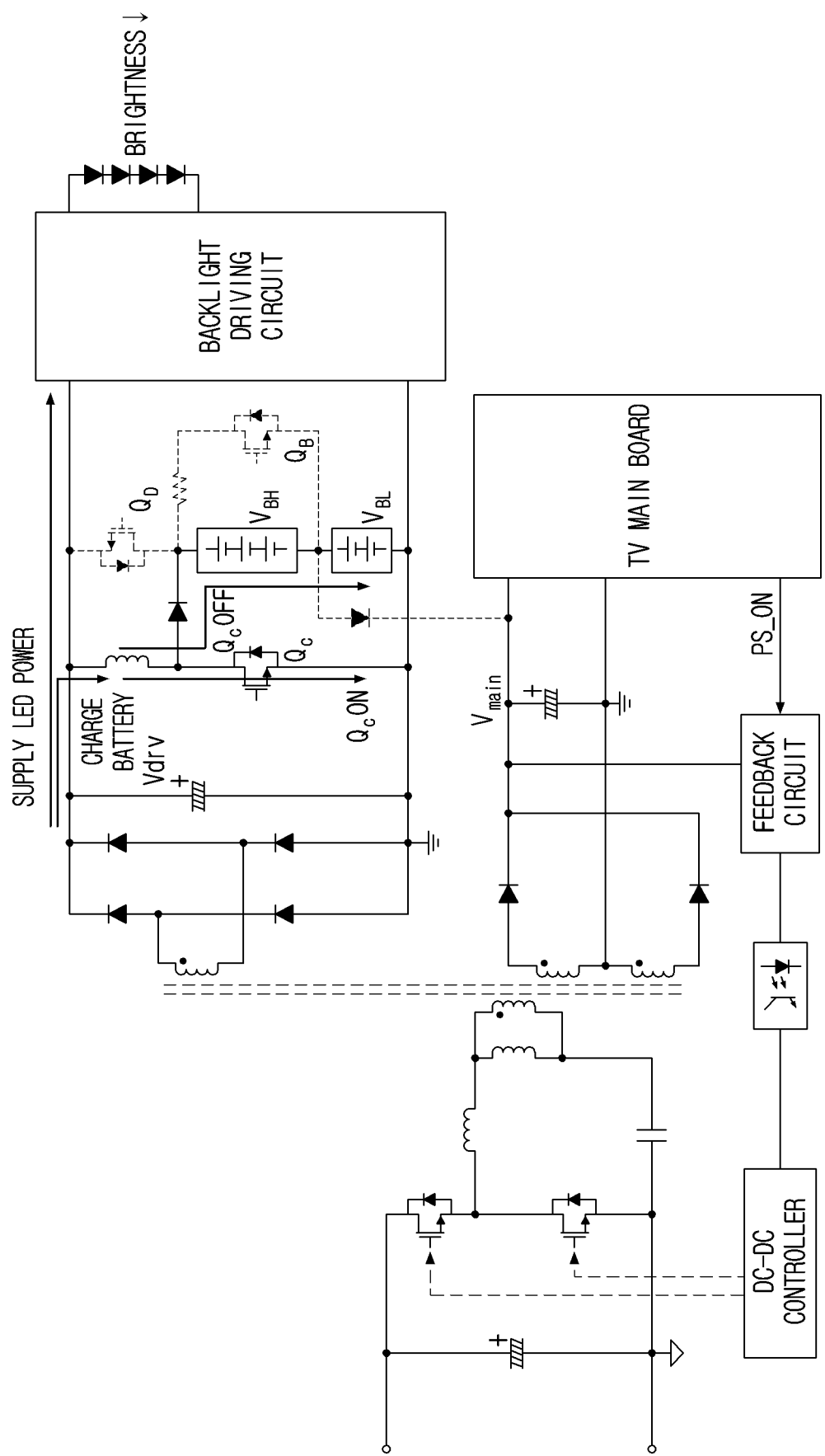
FIG. 4 is a diagram illustrating a charging and a backlight driving operation according to an embodiment.

FIG. 4 is a diagram illustrating an operation of charging and backlight driving according to an embodiment.

The control circuit 140 may charge the first battery 120 and the second battery 130 with the first power during the first time period. For example, the control circuit 140 may turn-off the first transistor during the first time period, and charge the first battery 120 and the second battery 130 with the first power by receiving the pulse width modulation (PWM) signal through the gate of the second transistor.

Specifically, the second transistor may be turned-on while at a high value of the PWM signal, and the inductor may be charged. The second transistor may be turned-off while at a low value of the PWM signal, and the first battery 120 and the second battery 130 may be charged through the discharging of the first power and the inductor. The sum of the voltage of the first battery 120 and the voltage of the second battery 130 may be greater than the voltage of the first power, but charging of the first battery 120 and the second battery 130 may be possible because the second diode is turned-on by discharging the inductor.

The display apparatus 100 may use about 70% or more of the whole power as energy to drive the backlight. Accordingly, when the driving of the backlight and charging of the first battery 120 and the second battery 130 are simultaneously performed, an increase in power supply capacity of the display apparatus 100 is needed, but this causes a problem of increasing material cost. To reduce the needed power, the main circuit may lower the brightness of the backlight to a threshold ratio during the first time period. Alternatively, the main circuit may lower the brightness of the backlight to a threshold ratio when the display apparatus is turned-on while the first battery and the second battery are being charged. This is because there is a high likelihood of the first time period generally being nighttime, and user convenience not deteriorating even if the brightness is lowered due to the brightness of a user surrounding being darker than a surrounding brightness. Rather, there is an effect of preventing a blinding effect of the user at nighttime by lowering the brightness to a threshold ratio. The first battery 120 and the second battery 130 may be charged with the remaining energy after driving the backlight, and a charging electric power may be represented as below.

battery charging electric power=(energy storable in battery−current energy)/nighttime electricity time Because the first time period is considerably long, the battery may be charged slowly. That is, even if the battery is charged with the energy remaining after driving the backlight, charging may be completed within the first time period.

The brightness of the backlight may be represented as below.

brightness (%)=(TV driving maximum electric power−charge battery electric power)/TV driving maximum electric power×100

Figure 5:
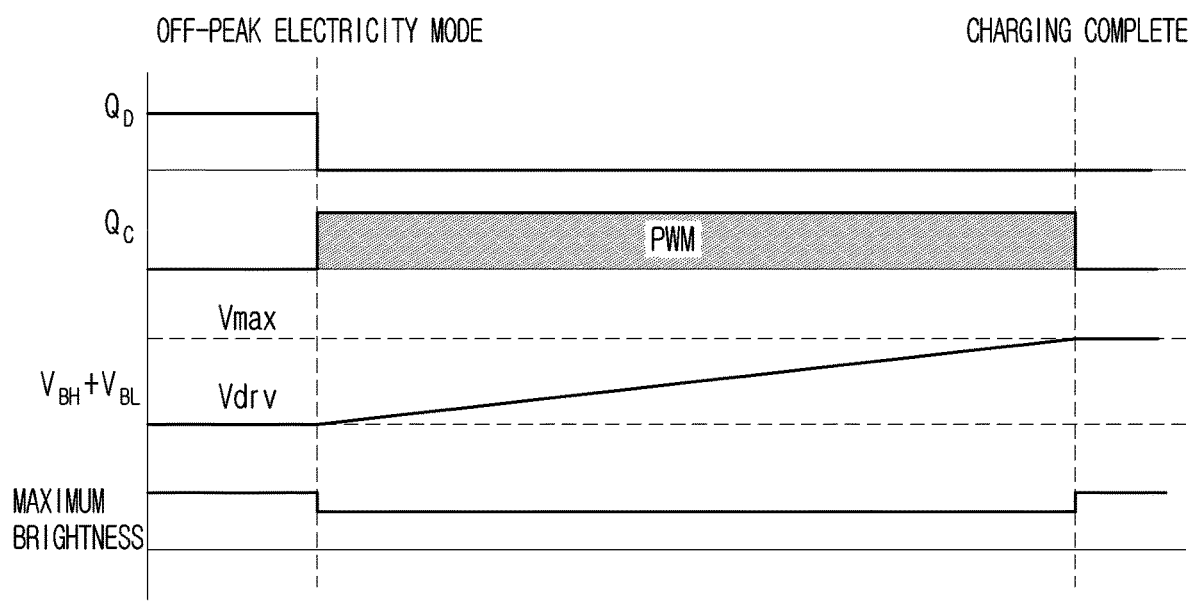
FIG. 5 is a diagram illustrating signals when performing an operation of charging and backlight driving according to an embodiment.

FIG. 5 is a diagram illustrating signals performing an operation of charging and backlight driving according to an embodiment.

As shown in FIG. 5, when entering the first time period (off-peak electricity mode), the first transistor may be turned-off as a low signal is input, and the second transistor may charge the first battery 120 and the second battery 130 as the PWM signal is input.

The sum of the voltage of the first battery 120 (VBH) and the voltage of the second battery 130 (VBL) may be maintained by a minimum first power (Vdrv). Specifically, this is because, if the sum of the voltage of the first battery 120 and the voltage of the second battery 130 become smaller than the first power, the second diode may be turned-on and charging may proceed regardless of whether the second transistor is turned-on.

The main circuit may lower the brightness of the backlight to a threshold ratio, and the voltage of the first battery 120 and the voltage of the second battery 130 may be charged to Vmax during the first time period.

Figure 6:
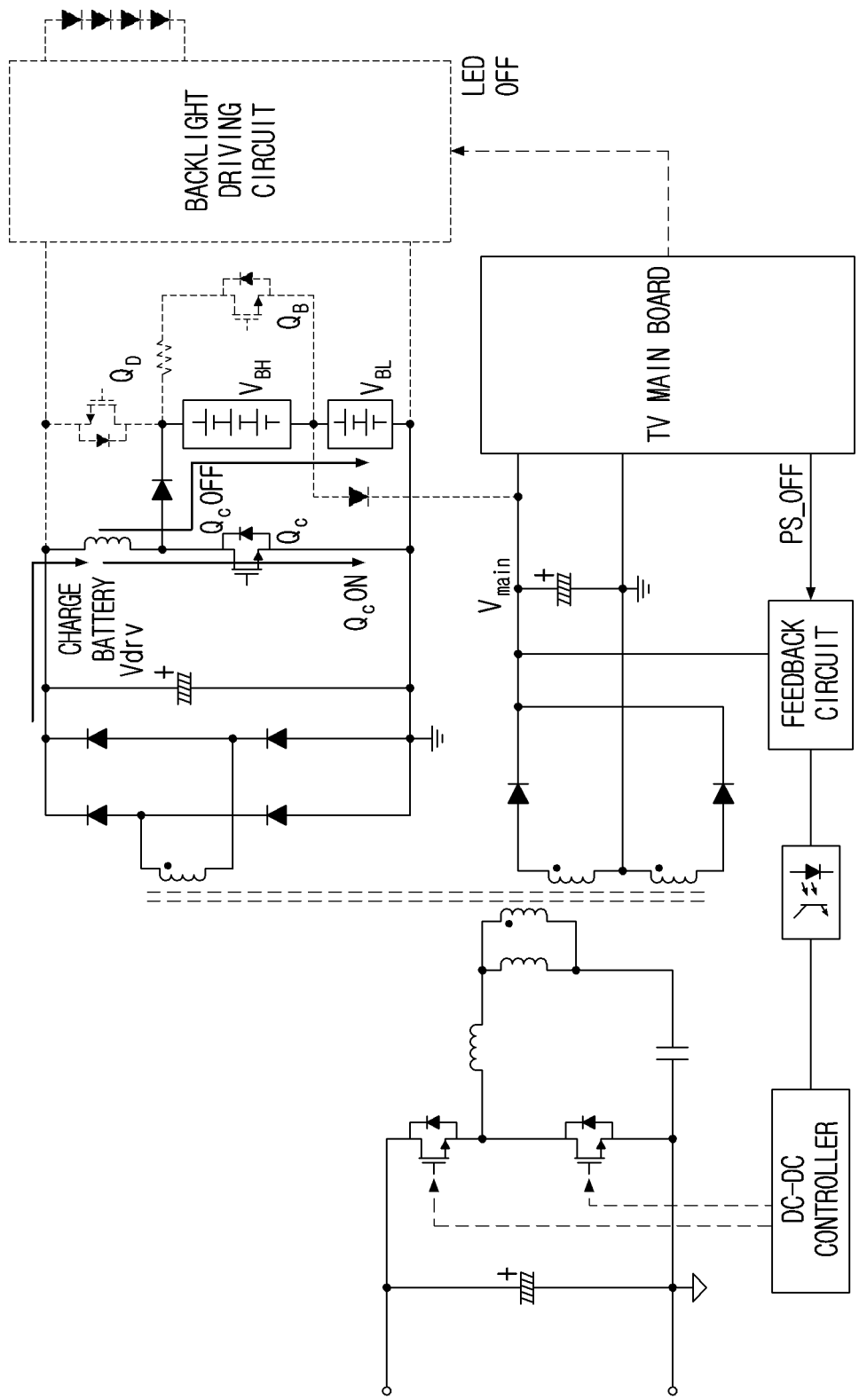
FIG. 6 is a diagram illustrating an operation of stopping backlight driving while charging according to an embodiment.

FIG. 6 is a diagram illustrating an operation of stopping backlight driving while charging according to an embodiment.

The viewing of content by the user may be stopped while charging the first battery 120 and the second battery 130. For example, the user may pause the content or turn off the display apparatus 100. In this case, as shown in FIG. 6, the main circuit may provide a backlight off (LED OFF) signal to the backlight, and because power is no longer supplied to the backlight, the whole first power may be used in the charging of the first battery 120 and the second battery 130.

However, in order to charge the first battery 120 and the second battery 130, the power supply 110 may continuously supply the first power. Then, when the charging of the first battery 120 and the second battery 130 is completed, the main circuit may turn-off the power supply 110 by providing a PS_OFF signal to the power supply 110.

Figure 7:
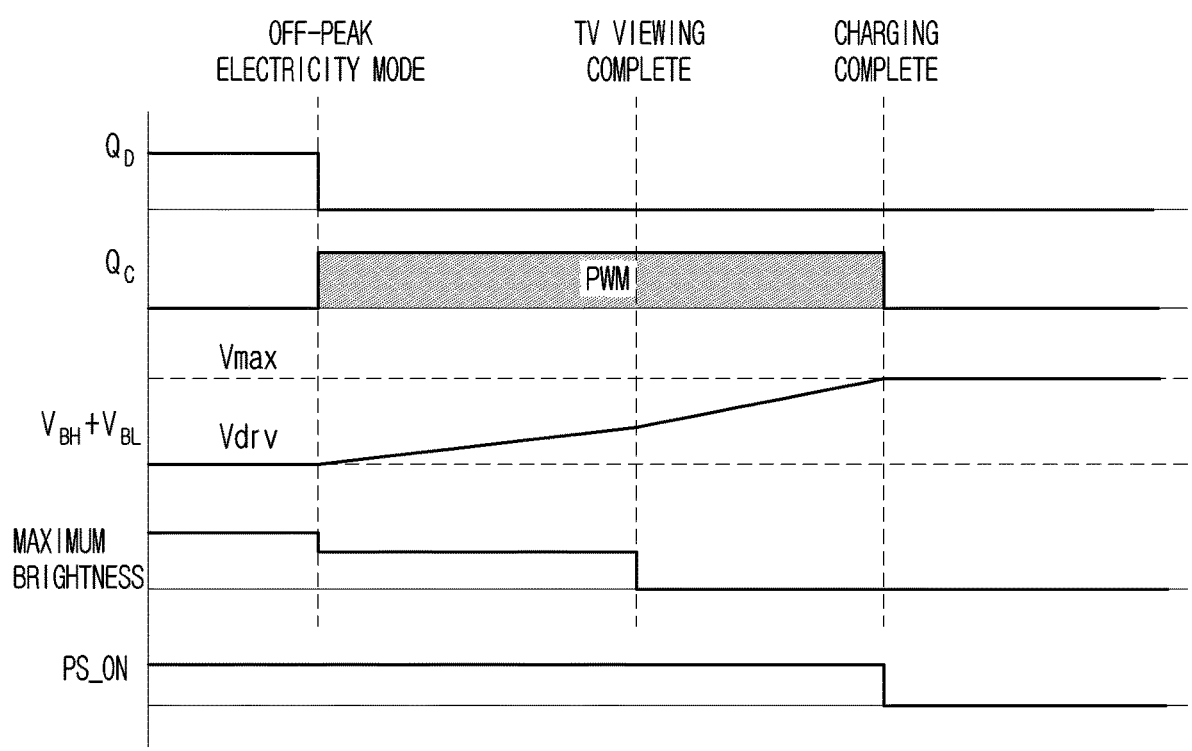
FIG. 7 is a diagram illustrating signals when performing an operation of stopping backlight driving while charging according to an embodiment.

FIG. 7 is a diagram illustrating signals when performing an operation of stopping backlight driving while charging according to an embodiment.

Because a time period from a point of off-peak electricity mode to a point of TV viewing complete in FIG. 7 is similar with the operation after the off-peak electricity mode in FIG. 5, redundant descriptions thereof will be omitted.

The brightness of the backlight may become 0 after the point of TV viewing complete, and a charging rate of the first battery 120 and the second battery 130 may become faster. Then, when the charging of the first battery 120 and the second battery 130 is complete, the main circuit may turn-off the power supply 110 by providing the PS_OFF signal to the power supply 110.

Figure 8:
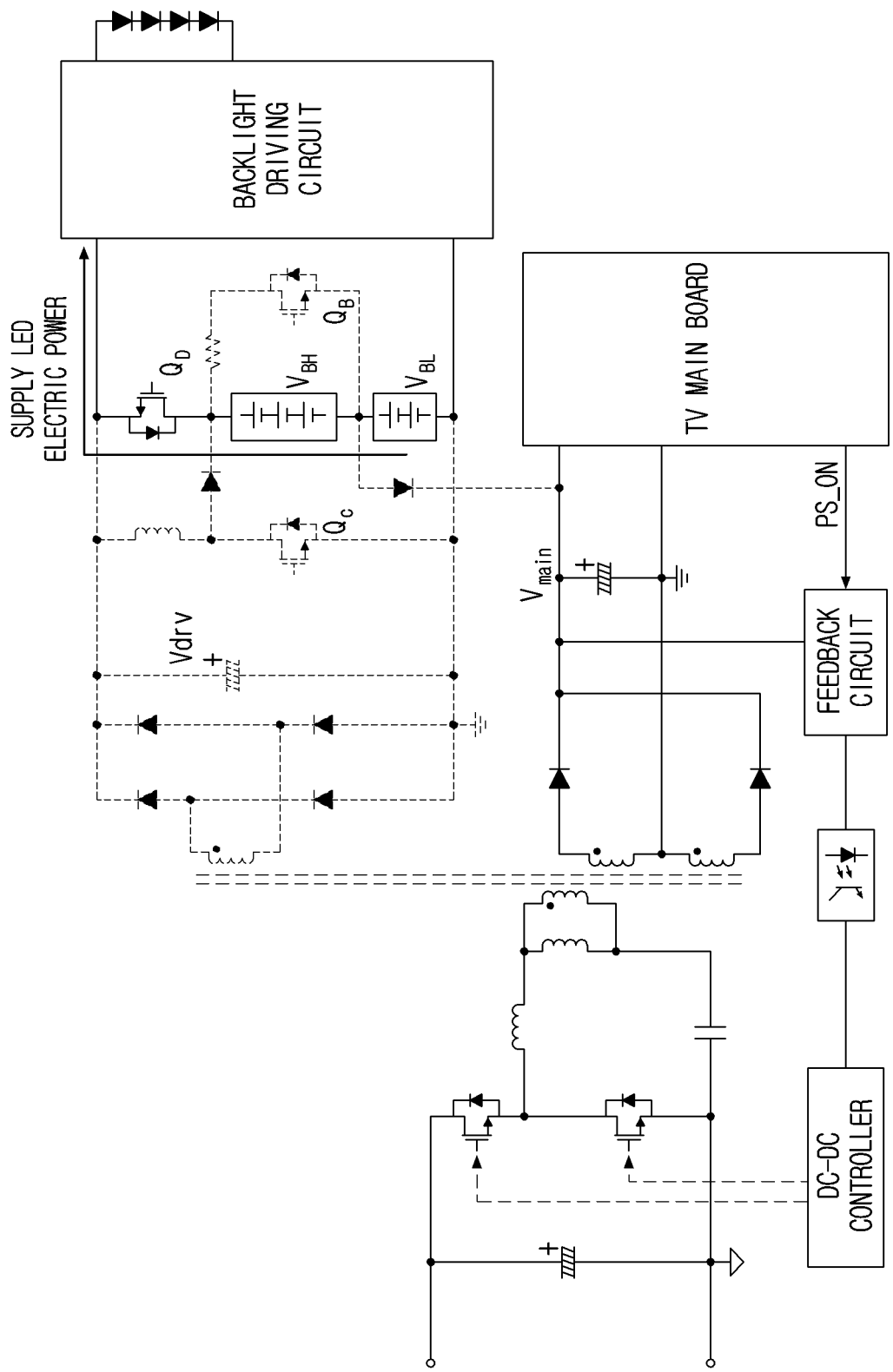
FIG. 8 is a diagram illustrating a discharging operation in an electric power peak time according to an embodiment.

FIG. 8 is a diagram illustrating a discharging operation in an electric power peak time according to an embodiment.

When the display apparatus 100 is turned-on at an electric power peak time, for example at daytime or at an electricity rate peak time set by the user, the control circuit 140 may turn-on the first transistor (QD) and drive the backlight with the power of the first battery 120 and the second battery 130 as shown in FIG. 8. Because the sum of the voltage of the first battery 120 and the voltage of the second battery 130 is greater than the voltage of the first power due to the charging operation, the first (i.e., external) power may not be used in the driving of the backlight. That is, the backlight may be driven with the power of the first battery 120 and the second battery 130 by turning-on only the first transistor, and a discharge converter circuit may not be necessary. The first battery 120 and the second battery 130 may supply power to the backlight until the sum of the voltages of the two batteries reach the voltage (Vdrv) of the first power.

Figure 9:
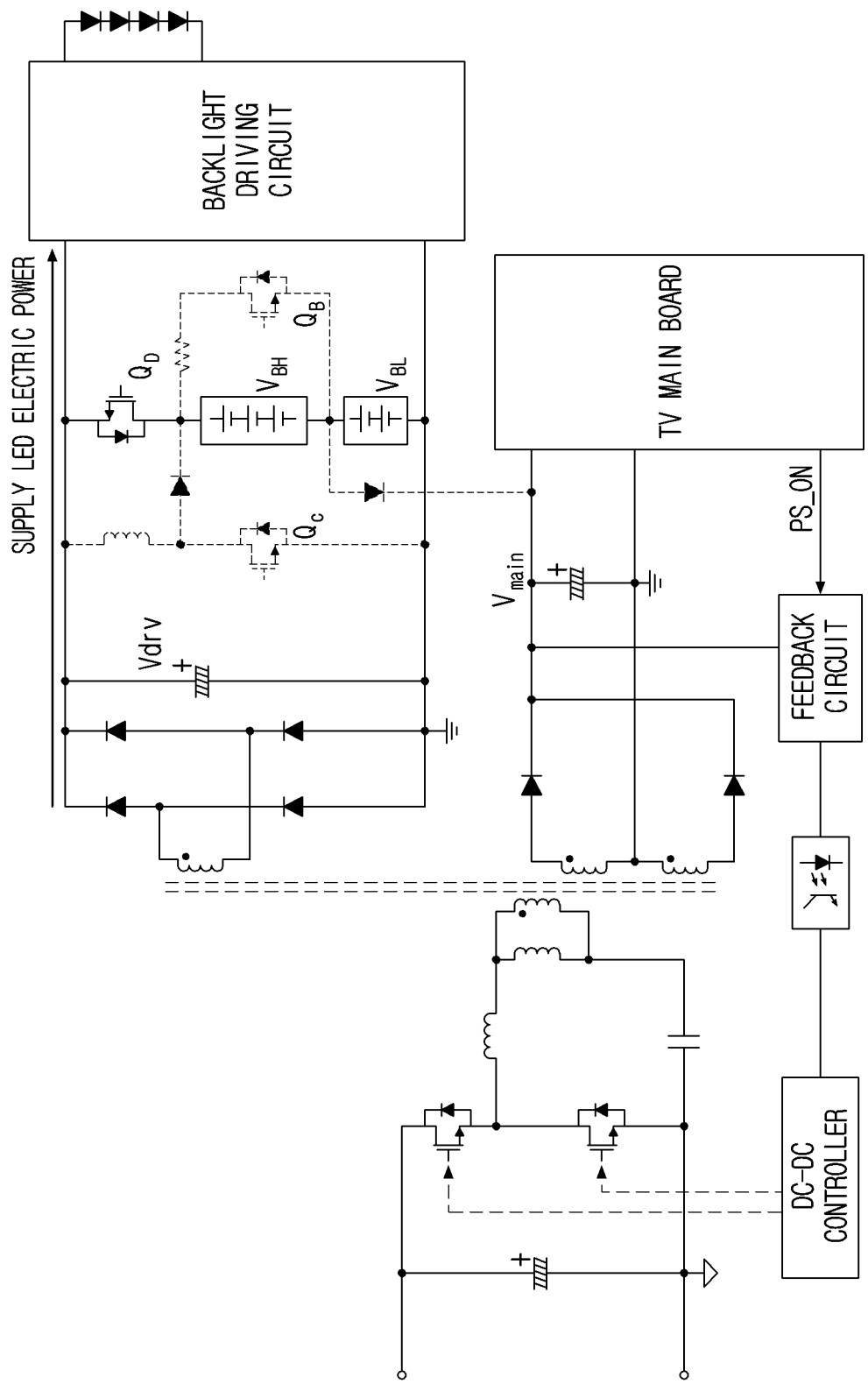
FIG. 9 is a diagram illustrating an operation after discharging in an electric power peak time is completed according to an embodiment.

FIG. 9 is a diagram illustrating an operation after discharging in an electric power peak time is completed according to an embodiment.

When the sum of the voltages of the first battery 120 and the second battery 130 reaches the voltage (Vdrv) of the first power, the discharging of the first battery 120 and the second battery 130 may be ended naturally, and the first power may be supplied to the backlight. Because the backlight driving circuit outputs a constant current to the backlight even if the input voltage is changed, large-capacity discharge converter for the first battery 120 and the second battery 130 is not needed.

Figure 10:
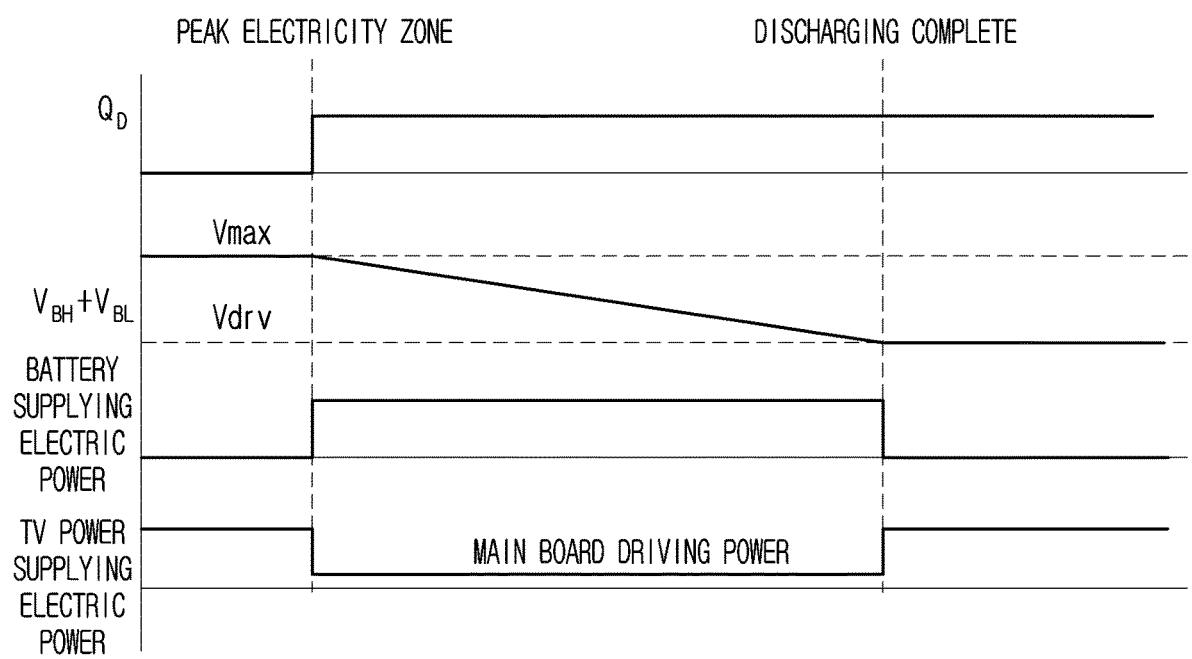
FIG. 10 is a diagram illustrating signals when discharging in an electric power peak time and signals after discharging is completed according to an embodiment.

FIG. 10 is a diagram illustrating signals when discharging in an electric power peak time and signals after discharging is completed according to an embodiment.

As shown in FIG. 10, when entering a second time period (a time period from a point of peak electricity zone to a point of discharging complete), the first transistor may be turned-on with the high signal being input, and the sum of the voltages of the first battery 120 and the second battery 130 may become smaller as the discharging of the first battery 120 and the second battery 130 is started.

When the sum of the voltages of the first battery 120 and the second battery 130 reaches the voltage (Vdrv) of the first power, the discharging of the first battery 120 and the second battery 130 may be ended naturally, and the first power may be supplied to the backlight. That is, when the discharging is complete, the first battery 120 and the second battery 130 may no longer supply power.

Figure 11:
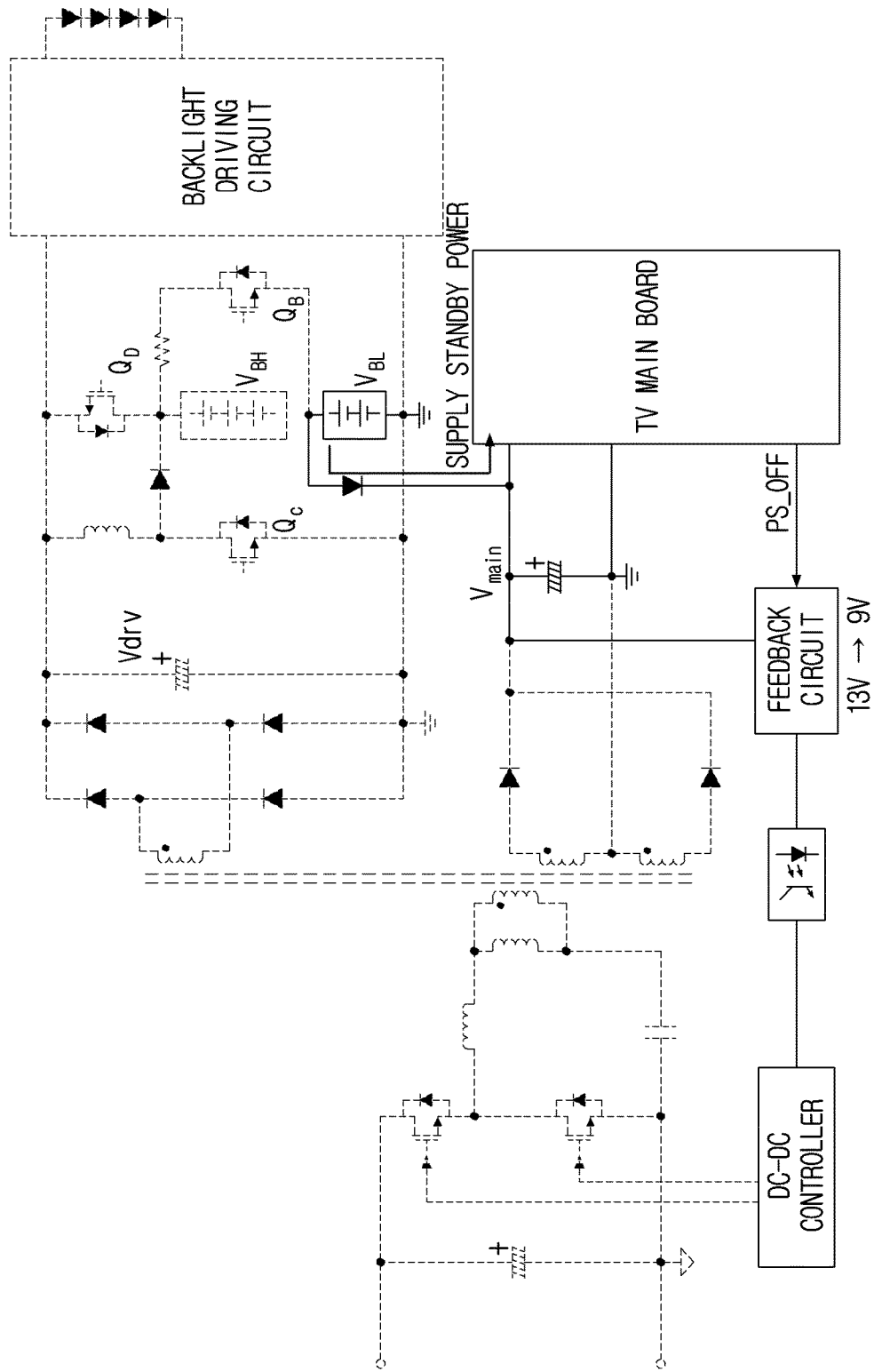
FIG. 11 is a diagram illustrating an operation when a display apparatus is turned-off according to an embodiment.

FIG. 11 is a diagram illustrating an operation when the display apparatus 100 is turned-off according to an embodiment.

When the display apparatus 100 is turned-off, the main circuit may transmit the PS_OFF signal to the power supply 110 and turn-off the power supply 110. In this case, the second battery 130 may supply power to the main circuit.

In general, products with standby electric power regulations such as a TV exhibit a decrease in efficiency when performing basic operations due to a power board design which considers a light-load operation to satisfy the standby electric power, and in an extremely light-load period such as a standby mode, an electric power conversion efficiency is at a level of about 50%. On the other hand, according to the disclosure, because the second battery 130 transfers electric power, the standby electric power may be transferred efficiently, and the standby electric power consumed from a wall power supply may be lowered to a level of nearly 0W.

However, if the standby mode is continued for a long time, the second battery 130 may be reduced to a minimum voltage, and in this case, the power supply 110 may again automatically operate the standby mode to maintain a preset voltage. That is, an over-discharge of a battery may be prevented because the voltage of the second battery 130 is not lowered than a preset voltage FIG. 12 is a diagram illustrating signals when the display apparatus 100 is turned-off according to an embodiment.

Figure 12:
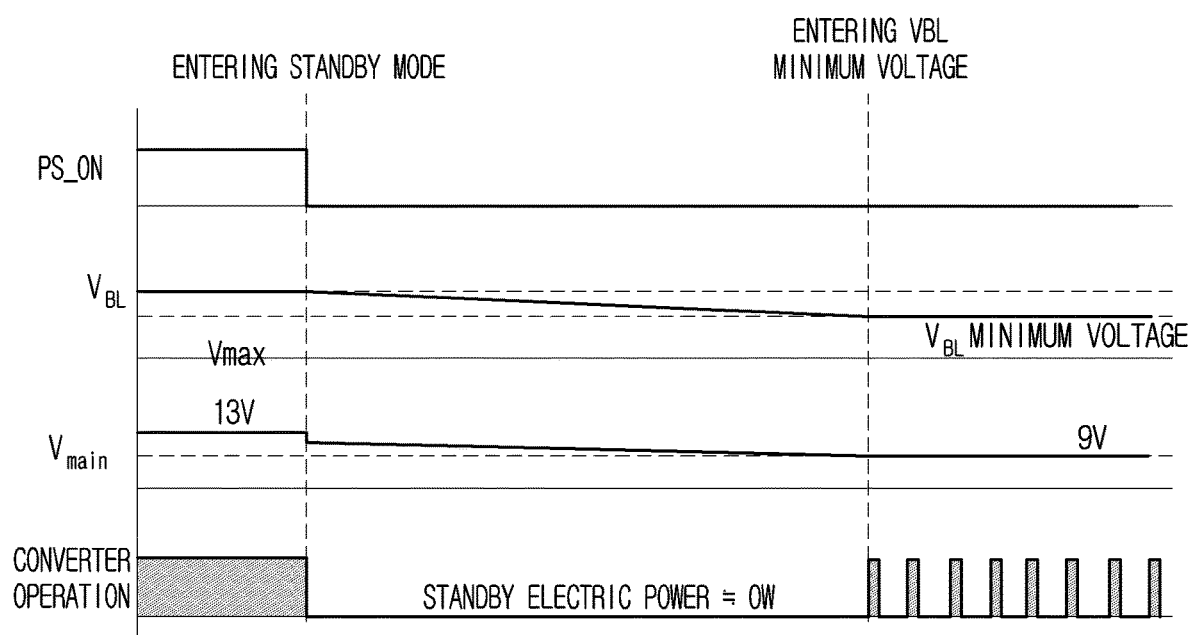
FIG. 12 is a diagram illustrating signals when a display apparatus is turned-off according to an embodiment.

As shown in FIG. 12, when the display apparatus 100 is turned-off and enters into a standby mode, the power supply 110 may be turned-off according to the PS_OFF signal.

In this case, the second battery 130 may supply power to the main circuit, and discharging may be started. If the discharging is continued and the second battery 130 reaches the minimum voltage, a DC-DC converter of the power supply 110 may automatically operate in the standby mode to maintain the second terminal with a preset voltage. Accordingly, the voltage of the second battery 130 may maintain a minimum voltage.

Figure 13:
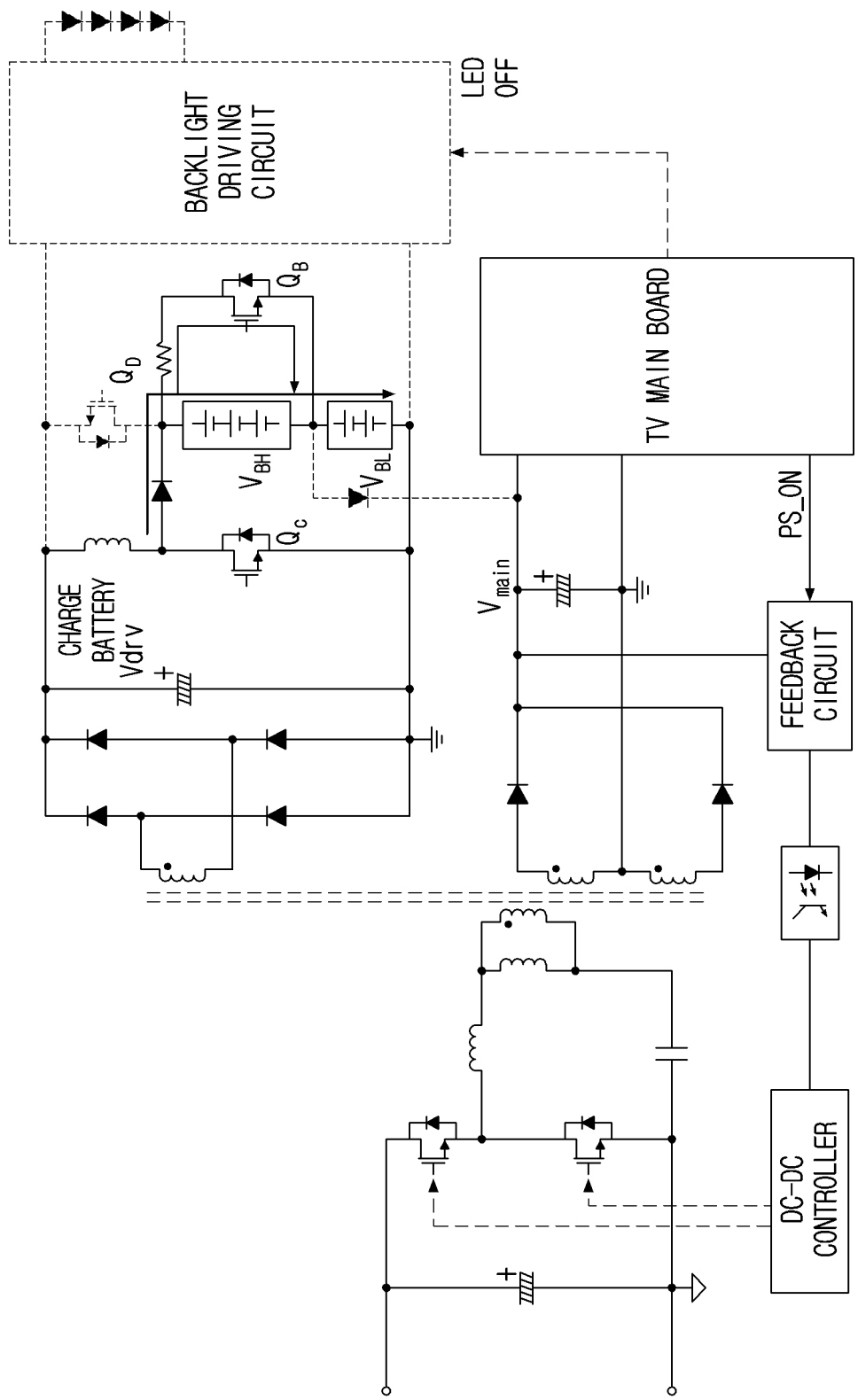
FIG. 13 is a diagram illustrating a balancing operation of a battery according to an embodiment.

FIG. 13 is a diagram illustrating a balancing operation of a battery according to an embodiment.

The first battery 120 and the second battery 130 may be charged and discharged with a same current in most operations. However, in the standby mode, only the second battery 130 is used, and in this case, a difference between the voltage per cell of the first battery 120 and the voltage per cell of the second battery 130 may increase, and a cell balancing may be intermittently needed to reduce the difference.

As shown in FIG. 13, the control circuit 140 may turn-on the third transistor (QB) at a threshold time point within the first time period and reduce a difference in a voltage of a cell included in the first battery 120 and a voltage of a cell included in the second battery 130. Specifically, the control circuit 140 may turn-on the third transistor at a threshold time point within the first time period and reduce a difference in the voltages that increased between two battery cells by consuming a portion of a charge amount that is charged in the first battery 120 and thereby reducing a difference with the charge amount that is charged in the second battery 130.

Figure 14:
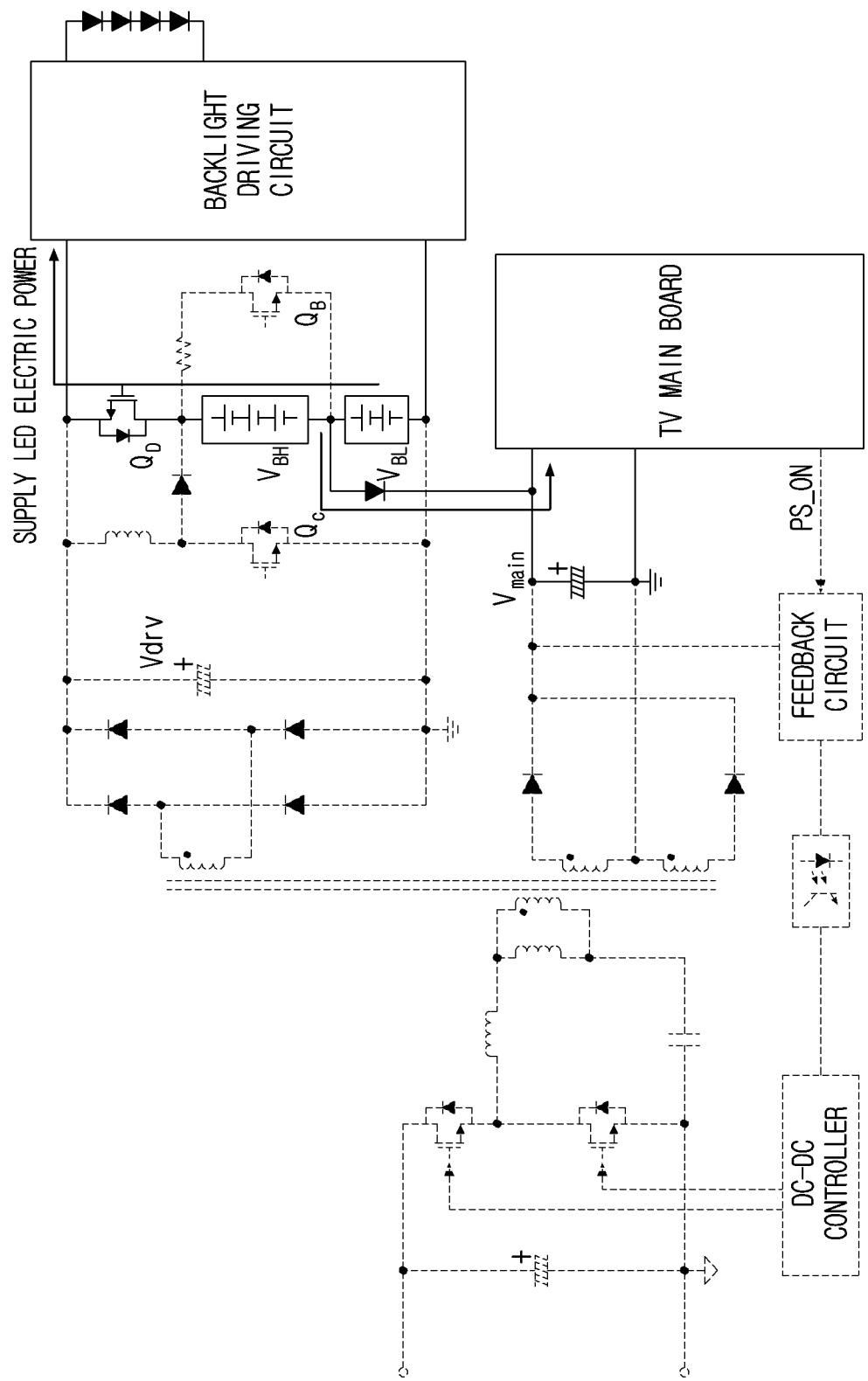
FIG. 14 is a diagram illustrating an operation when an alternating current power is not supplied to a power supply according to an embodiment.

FIG. 14 is a diagram illustrating an operation when alternating current power is not supplied to a power supply according to an embodiment.

If a power outage occurs or if the display apparatus 100 is not connected with the alternating current power, the control circuit 140 may drive the backlight with the power of the first battery 120 and the second battery 130, and drive the main circuit with the power of the second battery 130 as shown in FIG. 14.

Accordingly, the user may continue to view the display apparatus 100 even if external power is not supplied momentarily. In addition, user convenience may be enhanced as the user may temporarily use the display apparatus 100 as a mobile device.

Figure 15:
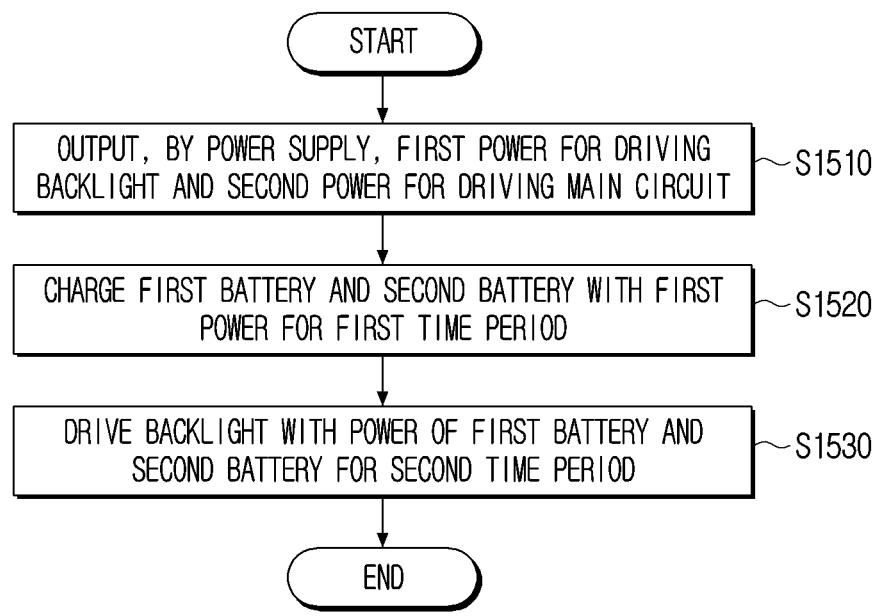
FIG. 15 is a flowchart illustrating a control method of a display apparatus according to an embodiment.

FIG. 15 is a flowchart illustrating a control method of a display apparatus according to an embodiment.

First, the power supply may output the first power for driving the backlight and the second power for driving the main circuit (S1510). Then, the first battery and the second battery may be charged with the first power during the first time period (S1520). Then, the backlight may be driven with the power of the first battery and the second battery during the second time period (S1530). Here, the first battery may supply power charged by the first power to the backlight, and the second battery may be connected to the first battery in series and may supply power charged by the first power to the backlight or the main circuit.

The operation of charging (S1520) may lower the brightness of the backlight to a threshold ratio when the display apparatus is turned-on while the first battery and the second battery are being charged.

If the display apparatus is turned-off, the operation of driving the main circuit with the power of the second battery may be further included.

In addition, the operation of driving (S1530) may include driving the backlight with the power of the first battery and the second battery, and driving the main circuit with the power of the second battery if the alternating current power is not supplied to the power supply.

The power supply may include the first terminal that outputs the first power and the second terminal that outputs the second power, and the display apparatus may include the first transistor by which a source is connected to the first terminal, and a drain is connected to one end of the first battery, the first diode by which an anode is connected to other end of the first battery, and a cathode is connected to the second terminal, the inductor by which one end is connected to the first terminal, the second transistor by which the drain is connected to other end of the inductor, and the source is grounded, and the second diode by which an anode is connected to other end of the inductor, and a cathode is connected to one end of the first battery, and the second battery may be configured such that one end is connected to the other end of the first battery, and the other end is grounded.

Here, the operation of charging (S1520) may include turning-off the first transistor during the first time period, and charging the first battery and the second battery with the first power by receiving the pulse width modulation (PWM) signal through the gate of the second transistor.

Then, the operation of driving (S1530) may include driving the backlight with the power of the first battery and the second battery by turning-on the first transistor during the second time period, and the sum of the voltage of the first battery and the voltage of the second battery may be greater than the voltage of the first power.

In addition, when the turn-off signal for the display apparatus is received, the operation of turning-off the power supply and the operation of driving the main circuit with the power of the second battery may be further included, and the voltage of the second battery may be smaller than the voltage of the second power.

Then, the display apparatus may further include the resistor by which one end is connected to one end of the first battery and the third transistor by which the drain is connected to the other end of the resistor, and the source is connected to the other end of the first battery.

Here, the operation of charging (S1520) may include turning-on the third transistor at a threshold time point within the first time period and reducing a difference in a voltage of a cell included in the first battery and a voltage of a cell included in the second battery.

The integrated circuit (IC) chip configured to receive the first control signal from the main circuit may be further included, and the control method may further include obtaining, by the IC chip, the second control signal based on the first control signal and controlling the charging and discharging of the first battery and the second battery based on the second control signal.

In addition, the voltage of the first battery may be greater than the voltage of the second battery.

Further, an operation of displaying a UI requesting the designations of the first time period and the second time period, and an operation of receiving the designations of the first time period and the second time period through an input interface may be further included.

According to the various embodiments of the disclosure as described above, the display apparatus may charge the battery using off-peak electricity at which the electricity rate is inexpensive, and by using the electric power of the battery at the electric power peak time at which the electricity rate is expensive, the electric power consumption of the display apparatus may be reduced.

In addition, the display apparatus may use a small capacity converter only when charging the battery, and because the converter is not used when discharging the battery, it may be implemented without a complex control of the charging and discharging converter.

Further, through the battery balancing operation, the difference in voltage between the plurality of battery cells may be reduced.

In addition, due to the charging and discharging operation of the battery of the display apparatus, an electric power distribution state of the whole electric power network may be improved.

According to an embodiment, the various embodiments described above may be implemented with software which includes one or more instructions stored in a machine-readable storage media (e.g., computer). The machine may call an instruction stored in the storage medium, and as a device operable according to the called instruction, may include an electronic device (e.g., electronic device (A)) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' indicates that the storage medium is tangible and does not include a signal, and the term does not differentiate data being semi-permanently stored or being temporarily stored in the storage medium.

According to an embodiment, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a server of a manufacturer, a server of an application store, or a storage medium such as a memory of a relay server, or temporarily generated.

According to an embodiment, the various embodiments described above may be implemented in a recordable medium which is readable by a computer or a device similar to the computer using software, hardware, or a combination of software and hardware. In some cases, embodiments described herein may be implemented by the processor itself. According to a software implementation, embodiments such as the procedures and functions described herein may be implemented with separate software modules. The respective software modules may perform one or more functions and operations described herein.

The computer instructions for performing processing operations of a device according to the various embodiments described above may be stored in a non-transitory computer-readable medium. The computer instructions stored in this non-transitory computer-readable medium may cause a specific device to perform the processing operations in the device according to the above-described various embodiments when executed by the processor of the specific device. The non-transitory computer readable medium may refer to a medium that stores data semi-permanently rather than storing data for a very short time, such as, for example, and without limitation, a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

In addition, respective elements (e.g., a module or a program) according to various embodiments may be configured with a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by the respective corresponding elements prior to integration. Operations performed by a module, a program, or another element, in accordance with various embodiments, may be executed sequentially, in parallel, repetitively, or in a heuristically manner, or at least some operations may be performed in a different order, omitted, or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus, comprising:
a backlight;
a main circuit;
a power supply configured to output a first power to drive the backlight and a second power to drive the main circuit;
a first battery configured to be charged by the first power and supply power to the backlight;
a second battery which is connected to the first battery in series, and configured to be charged by the first power and supply power to the backlight and the main circuit; and
a control circuit configured to control the first battery and the second battery to be charged with the first power for a first time period, and drive the backlight with first battery power of the first battery and second battery power of the second battery for a second time period.

2. The display apparatus of claim 1, wherein the main circuit is configured to reduce, based on the display apparatus being turned-on while the control circuit is charging the first battery and the second battery, a brightness of the backlight to a threshold ratio.

3. The display apparatus of claim 1, wherein the control circuit is further configured to drive, based on the display apparatus being turned-off, the main circuit with the second battery power.

4. The display apparatus of claim 1, wherein the control circuit is configured to drive, based on an alternating current power not being supplied to the power supply, the backlight with the first battery power and the second battery power, and drive the main circuit with the second battery power.

5. The display apparatus of claim 1, wherein the power supply comprises:
a first terminal configured to output the first power; and
a second terminal configured to output the second power,
wherein the control circuit comprises:
a first transistor comprising a source connected to the first terminal, and a drain connected to a first end of the first battery;
a first diode comprising an is connected to a second end of the first battery, and a cathode connected to the second terminal;
an inductor comprising a first end connected to the first terminal;
a second transistor comprising a drain connected to a second end of the inductor, and a source connected to a ground node; and
a second diode comprising an anode connected to the second end of the inductor, and a cathode connected to the first end of the first battery, and
wherein the second battery comprises a first end connected to the second end of the first battery, and a second end connected to the ground node.

6. The display apparatus of claim 5, wherein the control circuit is further configured to turn-off the first transistor during the first time period, and control the first battery and the second battery to be charged with the first power based on a pulse width modulation (PWM) signal received through a gate of the second transistor.

7. The display apparatus of claim 5, wherein the control circuit is further configured to turn-on the first transistor during the second time period and drive the backlight with power of the first battery power and the second battery power, and
wherein a sum of a first voltage of the first battery and a second voltage of the second battery is greater than a voltage of the first power.

8. The display apparatus of claim 5, wherein the main circuit is configured to turn-off the power supply based on a turn-off signal for the display apparatus being received,
wherein the control circuit is further configured to drive the main circuit with power of the second battery power, and
wherein a second voltage of the second battery is smaller than a voltage of the second power.

9. The display apparatus of claim 5, wherein the control circuit further comprises:
a resistor comprising a first end connected to the first end of the first battery; and
a third transistor comprising a drain connected to a second end of the resistor, and a source connected to the second end of the first battery.

10. The display apparatus of claim 9, wherein the control circuit is further configured to turn-on the third transistor at a threshold time point within the first time period to reduce a difference in a voltage of a cell comprised in the first battery and a voltage of a cell comprised in the second battery.

11. The display apparatus of claim 1, further comprising an integrated circuit (IC) chip configured to:
generate a second control signal based on a first control signal received from the main circuit; and
transmit the second control signal to the control circuit,
wherein the control circuit is further configured to control charging and discharging of the first battery and the second battery based on the second control signal.

12. The display apparatus of claim 1, wherein a voltage of the first battery is greater than a voltage of the second battery.

13. The display apparatus of claim 1, further comprising a display configured to display a user interface (UI) prompting a user to designate the first time period and the second time period.

14. A control method of a display apparatus, the control method comprising:
outputting, by a power supply, a first power to drive a backlight and a second power to drive a main circuit;
charging a first battery and a second battery with the first power for a first time period;
driving the backlight with first battery power of the first battery and second battery power of the second battery for a second time period; and
supplying the second battery power to the main circuit for a third time period,
wherein the second battery is connected to the first battery in series.

15. The control method of claim 14, wherein the charging comprises lowering, based on the display apparatus being turned-on while the first battery and the second battery are being charged, a brightness of the backlight to a threshold ratio.

16. A display apparatus comprising:
a power supply configured to output a first power to a first terminal and a second power to a second terminal;
a first battery configured to provide first battery power;
a second battery connected to the first battery in series and configured to provide second battery power; and
a control circuit configured to:
control the first battery and the second battery to be charged with the first power for a first time period; and
drive a backlight with the first battery power and the second battery power for a second time period.

17. The display apparatus of claim 16, further comprising a main circuit,
wherein the control circuit is further configured to drive the main circuit with the second battery power while the display apparatus is operating in a standby mode.

18. The display apparatus of claim 17, wherein the control circuit comprises a first transistor connected in series with the first battery between the first terminal and the first battery and the second battery, and
wherein the control circuit is further configured to turn the first transistor on during the second time period.

19. The display apparatus of claim 18, wherein the control circuit is further configured to turn the first transistor off during the second time period.

20. The display apparatus of claim 19, wherein the control circuit further comprises an inductor connected in parallel with the first transistor between the first terminal and the first battery.

* * * * *